US006634983B2

(12) United States Patent  
Nishimura

(10) Patent No.: US 6,634,983 B2
(45) Date of Patent: Oct. 21, 2003

(54) VEHICLE CLUTCH CONTROL DEVICE

(75) Inventor: Nobuyuki Nishimura, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 28 days.

(21) Appl. No.: 09/809,450

(22) Filed: Mar. 15, 2001

(65) Prior Publication Data

US 2001/0053732 A1 Dec. 20, 2001

(30) Foreign Application Priority Data

Jun. 14, 2000 (JP) ........................................ 2000-184547

(51) Int. Cl.[7] .............................................. B60K 41/02
(52) U.S. Cl. ............................ 477/85; 477/84; 477/91; 477/175
(58) Field of Search ........................... 477/83, 84, 85, 477/91, 175, 181; 192/3.58, 3.61, 3.62, 3.63

(56) References Cited

U.S. PATENT DOCUMENTS

| 4,618,043 A | * | 10/1986 | Hattori et al. ................ 477/85 |
| 4,714,144 A | * | 12/1987 | Speranza ..................... 477/84 |
| 4,732,055 A | * | 3/1988 | Tateno et al. ................ 477/73 |
| 5,072,815 A | | 12/1991 | Jarvis ....................... 192/0.08 |
| 5,445,576 A | | 8/1995 | Motamedi et al. .......... 477/105 |
| 5,478,293 A | | 12/1995 | Yonezawa ................... 477/110 |
| 5,595,550 A | * | 1/1997 | Jarvis et al. .................. 477/84 |
| 6,033,341 A | * | 3/2000 | Yamamoto et al. ........... 477/85 |
| 6,126,569 A | * | 10/2000 | Genise ........................ 477/91 |
| 6,171,213 B1 | * | 1/2001 | Kosik et al. .................. 477/84 |
| 2001/0034287 A1 | * | 10/2001 | Nishimura et al. ........... 477/84 |

FOREIGN PATENT DOCUMENTS

| DE | 196 44 477 A1 | 4/1997 |
| EP | 0 423 799 A | 4/1991 |

OTHER PUBLICATIONS

EP Search Report for Serial No. EP 01 10 6139 dated Mar. 13, 2003.

* cited by examiner

Primary Examiner—Jack Lavinder
Assistant Examiner—Thomas J. Williams
(74) Attorney, Agent, or Firm—McCormick, Paulding & Huber LLP

(57) ABSTRACT

A vehicle clutch control system that can prevent an engine (222) from racing when a friction clutch (304) is disengaged and engaged. When a driver stamps an accelerator pedal (206) over a predetermined depth at the time of completion of transmission gear speed change, clutch engagement is prohibited if a clutch rotation speed is slower than a prescribed speed, or an accelerator is maintained to a 0% opening position.

14 Claims, 5 Drawing Sheets

VEHICLE CLUTCH CONTROL DEVICE

CROSS REFERENCE TO RELATED APPLICATION

This application claims priority under 35 USC 119 of Japanese Patent Application No. 2000-184547 filed on Jun. 14, 2000, the entire disclosure of which is incorporated herein by reference.

BACKGROUND OF THE INVENTION

1. Field of the Invention

The present invention relates to a clutch control device for a vehicle provided with an automatic clutch function and an automatic transmission (gear speed change) function, and in particular to such a clutch control device that can eliminate wasteful racing of an engine when a clutch is disengaged and engaged.

2. Description of the Related Art

Some of recent vehicles are equipped with a controller and actuators that in combination operate various parts of the vehicles automatically. Specifically, the operation of mechanical parts necessary for the vehicle motion is caused not manually upon movements of pedals and levers, but a controller detects the movements of the pedals and levers, and operates the mechanical parts via actuators. Such vehicles are often equipped with an automatic clutch function and automatic transmission function such that the controller automatically determines the appropriate time for changing the gear speed of the transmission, controlling the clutch and the transmission without waiting for the driver's operation.

With a conventional automatic clutch function and automatic transmission function, the controller shifts a transmission even if a driver does not stamp a clutch pedal or move a gear change lever (shift lever). A driver sometimes stamps an accelerator pedal when a clutch engagement is proceeding during the gear speed change operation. In the meantime, an accelerator opening is instructed to an engine in response to the stamping of the accelerator pedal. In such a case, a great difference appears between a rotational speed of a flywheel of the engine and that of a driven plate of a clutch. This results in overslip of the clutch. If the engine load increases in this situation, the further clutch slip occurs, and the engine races. A similar problem occurs even if the vehicle is operated in a manual mode as far as the driver performs the gear speed change operation while he or she is stamping the accelerator pedal. Such wasteful racing is uncomfortable to the driver and wastes the fuel.

SUMMARY OF THE INVENTION

It is an object of the present invention to provide a vehicle clutch control device that can eliminate the wasteful racing of the engine when the clutch is disengaged and engaged.

According to one aspect of the present invention, there is provided an apparatus for controlling a vehicle clutch including a clutch actuator unit for engaging and disengaging a friction clutch, and a clutch controller for prohibiting the clutch actuator unit from engaging the clutch when an accelerator pedal is stamped over a predetermined value at a time of completion of transmission gear speed change, and a rotation speed of the clutch is slower than a prescribed speed. Since the clutch is not engaged in the above conditions, the engine will not race.

According to another aspect of the present invention, there is provided an apparatus for controlling a vehicle clutch including an engine controller for normally instructing an opening degree of an engine accelerator in accordance with an amount of stamping of an accelerator pedal but instructing 0% opening to an engine when the accelerator pedal is stamped over a predetermined value at a time of completion of transmission gear speed change, and a rotation speed of a clutch is slower than a prescribed speed. Normally, the accelerator opening is instructed to the engine according to the accelerator pedal stamping. However, 0% opening is instructed to the engine under the above conditions so that the engine will not race.

The apparatus may further include a clutch actuator unit for automatically engaging the clutch after a target clutch position is determined in accordance with an amount of stamping of a clutch pedal. The engine controller may stop instructing the 0% opening to the engine when an actual clutch position matches the target clutch position. The clutch actuator unit may hold the clutch to a completely disengaged position when the engine controller instructs the 0% opening to the engine. The engine controller may instruct the 0% opening to the engine while the transmission gear speed change is proceeding.

Additional objects, aspects and advantages of the present invention will become apparent to those skilled in the art to which the present invention relates from the subsequent description of the embodiment(s) and the appended claims, taken in conjunction with the accompanying drawings.

DETAILED DESCRIPTION OF THE INVENTION

Figure 1:
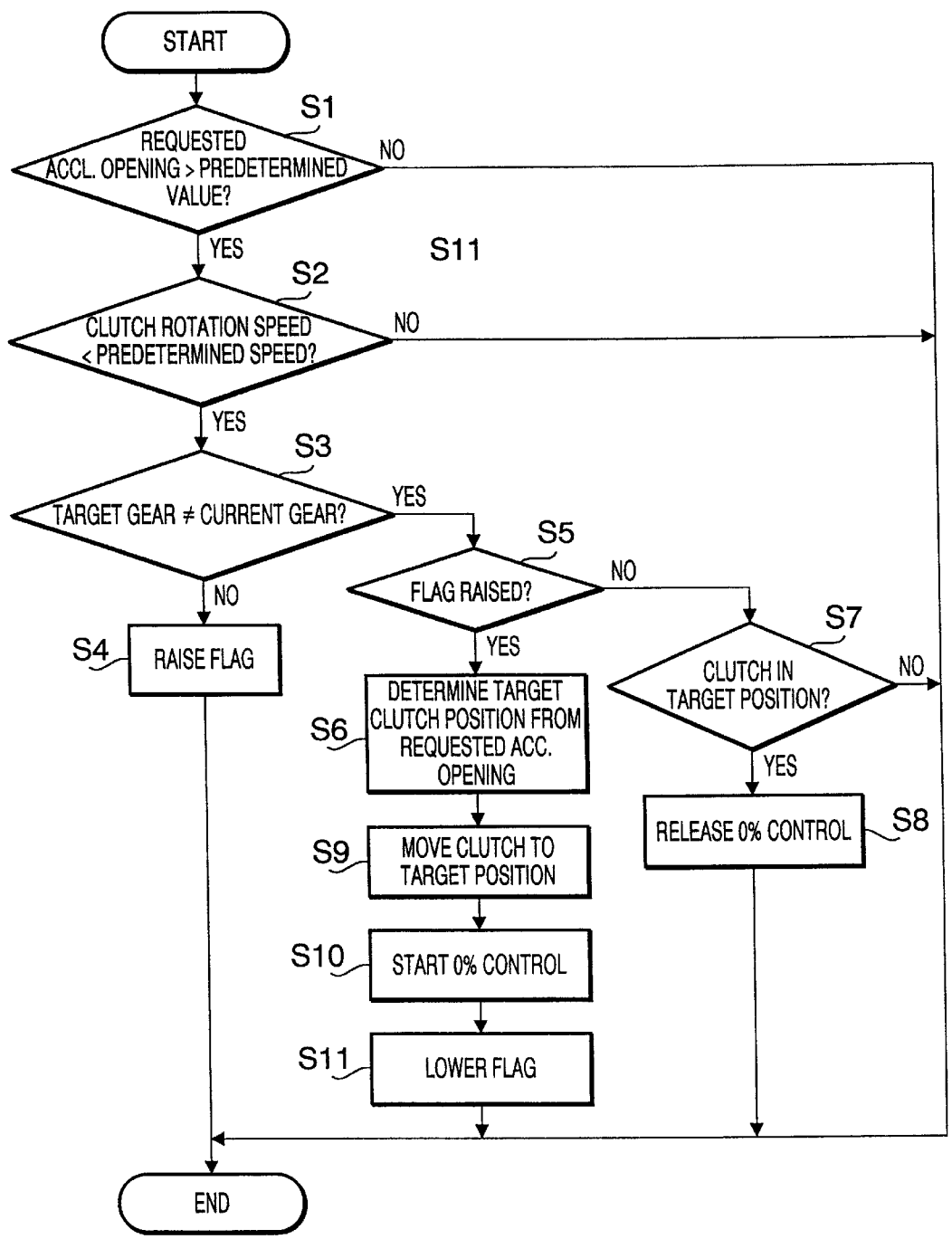
FIG. 1 illustrates a flowchart of an accelerator opening 0% control performed by a clutch control device of the present invention.

An embodiment of the present invention will be described in reference to the accompanying drawings.

Clutch control of the invention will first be briefly described. When gear speed change is complete, it is determined whether a requested accelerator opening, which corresponds to how deep an accelerator pedal is stamped, exceeds a predetermined value. It is also determined whether a clutch rotation speed is lower than a prescribed value. If both answers are yes, an engine accelerator opening (controlled accelerator opening) issued to the engine from an engine controller is set to 0%. This is referred to as accelerator 0% control. Then, a clutch position is changed to a target clutch position, which corresponds to the requested accelerator opening. Subsequently, the engine controller cancels the accelerator 0% control and issues the controlled accelerator opening, which corresponds to the requested accelerator opening, to the engine.

A clutch control device of the invention is applied to, for example, a vehicle with a multi-speed transmission assembly. Such a vehicle will be described in reference to FIG. 2.

A vehicle includes an engine 222, a friction clutch 304, a multi-speed transmission assembly 201 which is coupled to the engine 222 over the friction clutch 304, and a pneumatic cylinder system 202 which serves as the actuator for the multi-speed transmission assembly 201. An engine speed sensor 203 is attached to the engine 222 to detect the engine revolution speed. An output shaft speed sensor 204 is attached to the transmission assembly 201 to detect the revolution speed of an output shaft of the transmission assembly 201 as vehicle speed. A controller (TMCU) 205 for the multi-speed transmission 201 constitutes the clutch control means controlling the engaging and disengaging of the clutch 304 and the transmission control means controlling the change of the gear speeds of the multi-speed transmission 201. An accelerator sensor 206 is connected to TMCU 205 and detects (determines) an accelerator opening requested by a driver (requested accelerator opening) based on how deep an accelerator pedal is stamped. A gear change lever unit 207 sends information about a gear position change (or shift lever movement) made by the driver to the TMCU 205. An automatic/manual (A/M) toggle switch is provided at a top of a shift lever stem for switching the operation mode of the transmission between automatic and manual modes. An emergency gear change switch 208 allows the driver to forcibly select a gear speed in special circumstances, such as emergencies. A clutch pedal 209 is stamped and released by the driver to disengage and engage the clutch 304 in the manual operation mode. An indicator unit 210 in a dashboard console displays a currently selected gear as a number. An engine control unit (ECU) 211 is associated with the engine 222 and informs the engine 222 of the controlled accelerator opening and the fuel injection time. A clutch actuator 212 is associated with the clutch 304 to engage and disengage the clutch 304 under the control of TMCU 205. A clutch stroke sensor is provided to detect a position of the actuator 212. Reference numeral 224 designates a fuel injector and 226 designates a magnetic valve for maintaining an air pressure.

The transmission controller 205 receives signals indicative of the vehicle's running status from the engine speed sensor 203, the output shaft speed sensor 204 and other sensors/detectors, and reads data from shift-down and shift-up maps from its memory. The transmission controller 205 can perform various processes at time intervals of several dozen ms by multi-timer interrupts. The transmission controller 205 and the engine controller 211 are connected by a bus cable and can communicate with one another. The gear change lever 207 has the stable positions of reverse (R), neutral (N), drive (D) and hold (H), as well as the momentary positions of shift-up request (UP) and shift-down request (DOWN).

Figure 2:
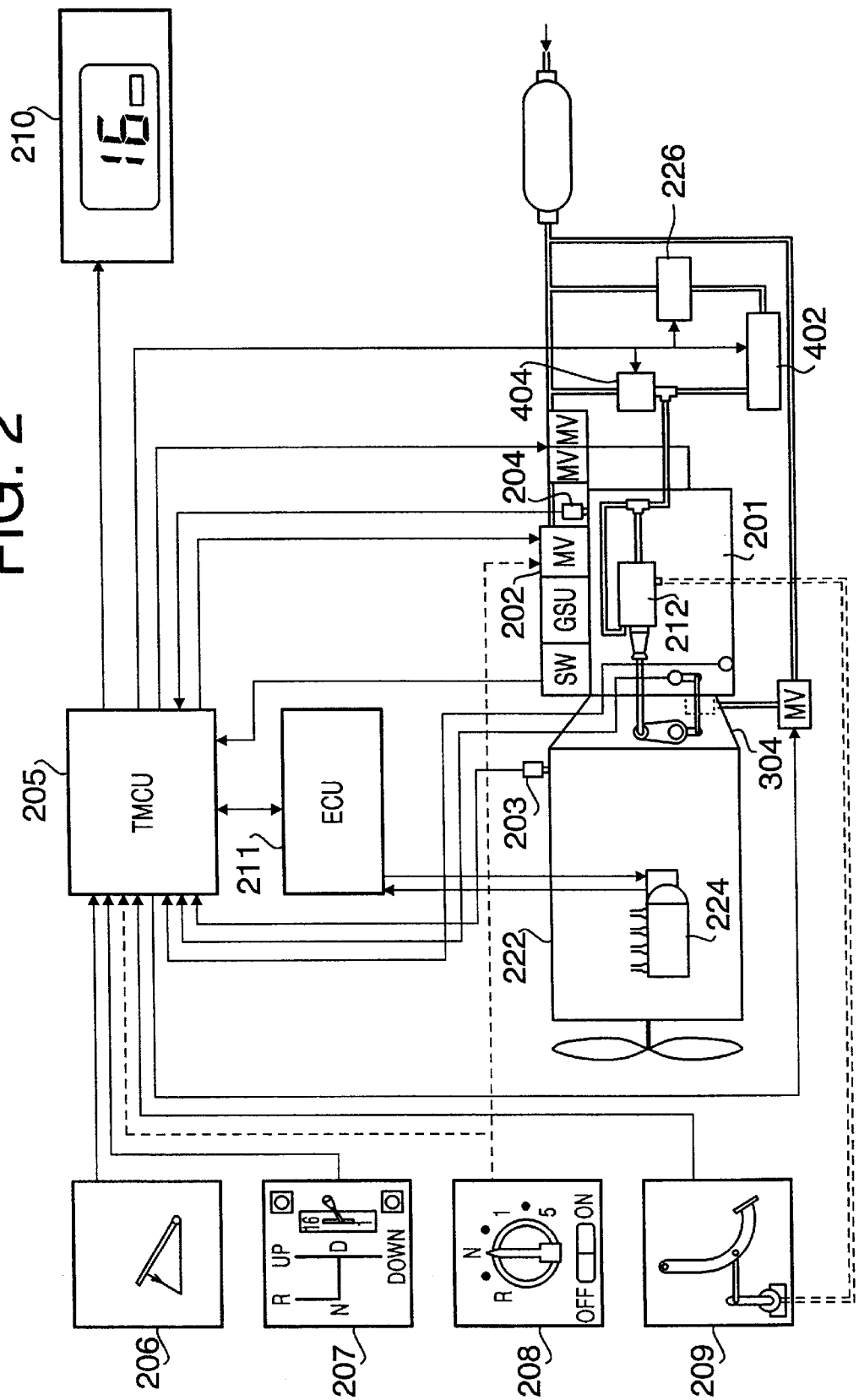
FIG. 2 illustrates major parts and elements of a vehicle using the clutch control device of the present invention.
Figure 3:
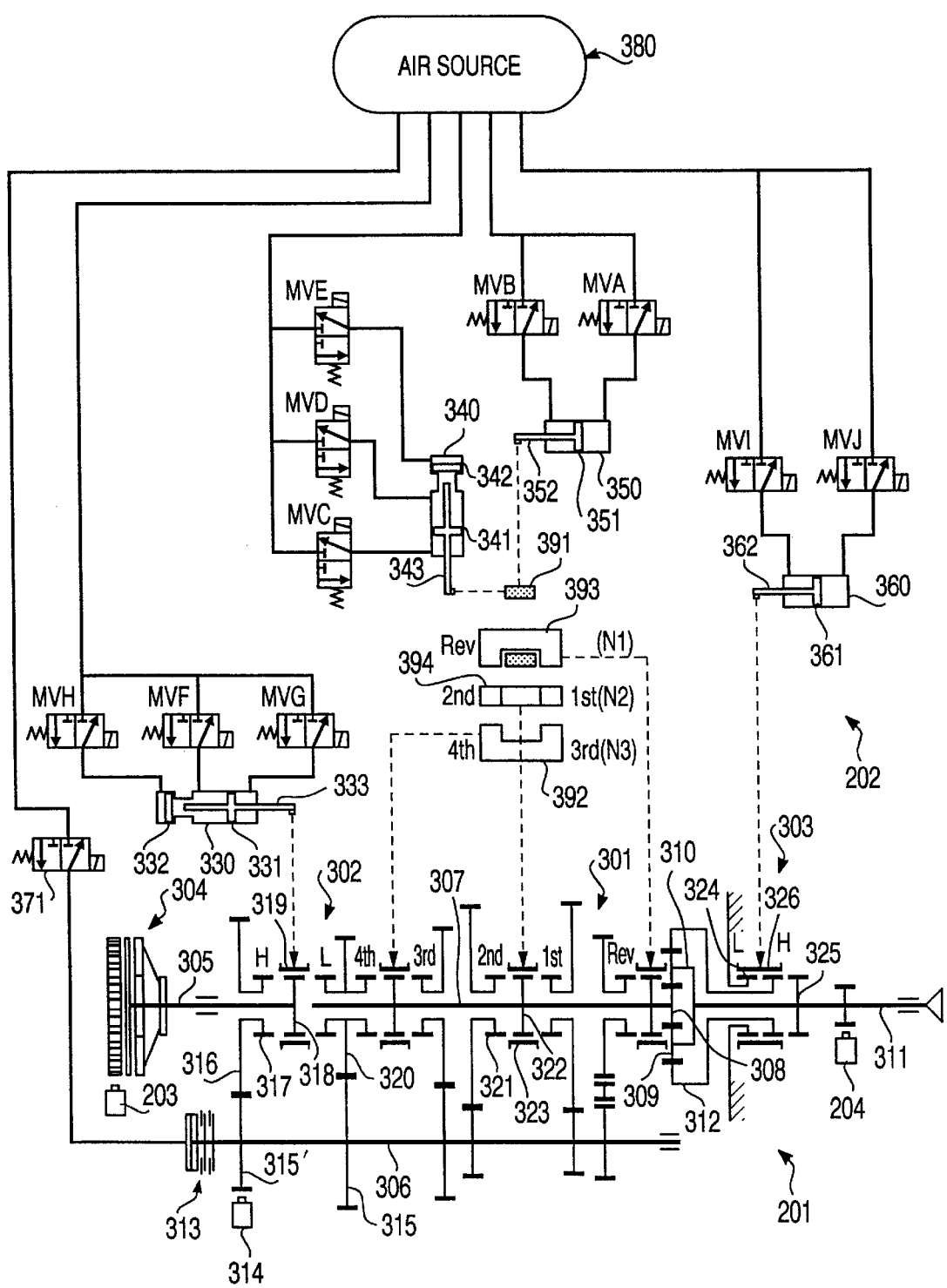
FIG. 3 illustrates a detail of a multi-speed transmission assembly and pneumatic cylinder system shown in FIG. 2.

The detail of the multi-speed transmission assembly 201 and the pneumatic cylinder system 202 shown in FIG. 2 will be described with reference to FIG. 3.

The multi-speed transmission assembly 201 includes a two-speed splitter 302 whose transmission ratio is relatively small, a 4-speed main gear box 301 located behind the splitter 302, and a 2-speed range 303 whose transmission ratio is relatively large and located behind the main bear box 301. The splitter 302 has three positions, i.e., high speed (H), low speed (L) and neutral. A splitter gear 316, a splitter dog gear 317, and a sleeve 319 are arranged inside the splitter 302. The splitter gear 316 normally meshes with a counter gear 315' on a counter shaft 306. The splitter dog gear 317 is formed in one piece with the splitter gear 316. The sleeve 319 normally meshes with an input shaft gear 318 formed in one piece with the input shaft 305, and can mesh with either the splitter dog gear 317 or another dog gear 321 in the main transmission 301 (described below). The splitter 302 can transmit the rotation of the input shaft 305, taken from a driven plate of the clutch 304, at the transmission ratio H or L to the counter shaft 306, or block it. When the splitter 302 is in the neutral position, the input shaft rotation is interrupted.

The main transmission 301 has six positions, i.e., 1st, 2nd, 3rd, 4th, reverse and neutral. A plurality of counter gears 315, a plurality of main gears 320, a plurality of dog gears 321, and a plurality of sleeves 323 are arranged inside the main transmission 301. The counter gears 315 are formed in one piece with the counter shaft 306. The main gears 320 are normally engaged with the corresponding counter gears 315. The dog gears 321 are formed in one piece with the main gears 320. The sleeves 323 are normally engaged with main shaft gears 322 formed in one piece with the main shaft 307, and can engage with adjacent dog gears 321. When the splitter 302 is in the L position, the rotation of the input shaft 305 is transferred to the counter shaft 306 at the lower ratio and causes the dog gears 321 to rotate relatively slowly in the main transmission 301. Upon sliding one of the sleeves 323 over one adjacent dog gear 321, one of the four forward speeds or the reverse is selected in the main gear transmission 301 so that the rotation of the input shaft is transferred to the main shaft 307 at the selected gear speed. The sleeves 323 are actuated by the pneumatic cylinder system 202. If no sleeves 323 are slid, the rotations of the dog gears 321 are not transferred to the main shaft 307, i.e., blocked in the main transmission 301. On the other hand, when the splitter 302 is in the H position, the rotation of the input shaft 305 is transferred to the counter shaft 306 at the higher ratio, and the dog gears 321 are caused to rotate at a relatively high speed. Upon sliding one sleeve 323, one of the four forward speeds or the reverse is selected and the rotation of the engaged dog gear is transferred to the main shaft 307 at the selected gear. If no sleeves 232 are slid, no rotations are transmitted to the main shaft 307 in the main transmission 301.

The range gear unit 303 has a planetary gear set. A sun gear 308 positioned at the center of the planetary gear set is fixed to the main shaft 307, a carrier 310 coaxially holding the planetary gears 309 disposed around the sun gear 308 is fixed to an output shaft 311, and the rotation of the main shaft 307 can be transmitted to the output shaft 311 at the transmission ratio L or H of the range gear 303 by switching the coupling of a ring gear 312 disposed around the planetary gears 309 between splines 324 extending from the transmission housing and splines 325 extending from the output shaft 311.

Reference numeral 313 denotes a counter shaft brake, and numeral 314 denotes a counter shaft speed sensor. These components are used for synchronizing the speed of the dog gear 321 on the main shaft 307 to the speed of the sleeve 323, in an electronic synchronization control that replaces the mechanical synchronization control.

The pneumatic cylinder system 202 includes a splitter cylinder 330 whose stroke is controlled by three electromagnetic valves, a select cylinder 340 whose stroke is controlled by three electromagnetic valves, a sleeve shift cylinder 350 whose stroke is controlled by two electromagnetic valves, a range cylinder 360 whose stroke is controlled by two electromagnetic valves, and a counter shaft brake cylinder 313 which is turned on and off with a single electromagnetic valve 371, and the combined operation of these electromagnetic valves selectively actuates the various parts and portions of the multi-speed transmission assembly 201. Reference numeral 380 denotes an air source.

In the splitter cylinder 330, the electromagnetic valve MVH is connected to the cylinder base, the electromagnetic valve MVF is connected to the cylinder body, and the electromagnetic valve MVG is connected to the cylinder top, a head 331 provided with rods on both sides is accommodated in the cylinder body, and another head 332 without rods is accommodated in the cylinder base.

The splitter cylinder 330 operates as follows: When only the electromagnetic valve MVF is actuated, then the head 331 moves toward the cylinder head (to the right in FIG. 3) so that in the splitter 302 the splitter sleeve 319 linked to the rod 333 moves into the L position. When only the electromagnetic valve MVG is actuated, then the head 331 moves toward the cylinder base (to the left in FIG. 3) so that the splitter sleeve 319 moves into the H position. When the electromagnetic valves MVG and MVH are actuated, then the other head 332 moves toward the cylinder body so that a movement of the head 331 toward the cylinder base is checked by its left rod and stopped at an intermediate position. As a result, the splitter sleeve 319 stops at a neutral position.

In the select cylinder 340 the electromagnetic valve MVE is connected to the cylinder base, the electromagnetic valve MVD is connected to the cylinder body, and the electromagnetic valve MVC is connected to the cylinder head. A head 341 provided with rods on both sides is accommodated in the cylinder body, and another head 342 without rods is accommodated in the cylinder base.

The select cylinder 340 operates as follows: When only the electromagnetic valve MVD is actuated, then the head 341 moves toward the cylinder head (downward in FIG. 3) so that the selector 391 linked to the rod 343 moves to the N3 position of the shifter 392. From the N3 position, the main gear transmission 301 can be put into 3rd or 4th gear. When only the electromagnetic valve MVC is actuated, then the head 341 moves toward the cylinder base (upward in the drawing) so that the selector 391 moves to the N1 position of the shifter 393. From the N1 position, the main gear transmission device 301 can be put into the reverse gear. When the electromagnetic valves MVC and MVE are operated, the other head 342 moves toward the cylinder body so that a movement of the head 341 toward the cylinder base is checked by the rod and stopped at an intermediate position, and the selector 391 stops at the N2 position of the shifter 294. From the N2 position, the main gear transmission 301 can be put into 1st or 2nd gear.

In the sleeve shift cylinder 350, the electromagnetic valve MVB is connected to the cylinder head, and the electromagnetic valve MVA is connected to the cylinder base. A single head 351 provided with a single rod 352 is accommodated in the cylinder body.

The sleeve shift cylinder 350 operates as follows: When only the electromagnetic valve MVA is actuated, then the head 351 moves toward the cylinder head (to the left in FIG. 3), so that the selector 391 linked to the rod 352 moves toward the direction of the reverse, 2nd and 4th (to the left in the drawing). When only the electromagnetic valve MVB is actuated, then the head 351 moves toward the cylinder base (to the right in FIG. 3) so that the selector 391 moves to the direction of the 1st and 3rd gears. When both the electromagnetic valves MVA and MVB are operated, the head 351 is in the neutral position, and the selector 391 is also in the neutral position.

The shifters 393, 394 and 392 are coupled to the respective sleeves 323 of the main transmission 301. If the select cylinder 340 moves the selector 391 into one of the positions N1, N2 and N3 and then the sleeve shift cylinder 350 moves the selector 391 right or left in FIG. 3, a desired sleeve 323 meshes with a desired dog gear 321 so that the main transmission 301 can be changed into the first, second, third or fourth forward gear or the reverse gear. Moreover, it is possible to put the main transmission 301 into neutral by putting the selector 391 into the neutral position.

In the range shift cylinder 360, the electromagnetic valve MVI is connected to the cylinder head, and the electromagnetic valve MVJ is connected to the cylinder base. A single head 361 provided with a rod 362 is accommodated in the cylinder body.

The range shift cylinder 360 operates as follows: When only the electromagnetic valve MVI is actuated, then the head 361 moves toward the cylinder base (to the right in FIG. 3), so that the range sleeve 326 of the range 303 coupled to the rod 362 moves into the H position. When only the electromagnetic valve MVJ is actuated, then the head 361 moves toward the cylinder head (to the left in FIG. 3) so that the range sleeve 326 moves into the L position.

By selectively turning the electromagnetic valves of this pneumatic cylinder system 202 on and off in combination, the multi-speed transmission assembly 201 can be switched to 16 forward speed positions and two reverse speed positions, as well as the splitter neutral position and the main transmission neutral position.

A detection means is provided for detecting a current gear position of the transmission assembly 201 from conditions of the electromagnetic valves. Alternatively, stroke detection means may be provided for detecting strokes of the respective rods of the pneumatic cylinders to determine a gear position of the transmission assembly 201.

The configuration of the actuator unit 212 (FIG. 2) for the clutch 304 will be described with reference to FIG. 4.

This actuator unit 212 includes a clutch booster 401 for engaging and disengaging the clutch 304, a proportional valve 402 which pneumatically gives a stroke amount to this clutch booster 401, an on/off valve 403 located upstream of the proportional valve to block air supply, an emergency valve 404 for forcibly disengaging the clutch completely, and the clutch pedal 209 which hydraulically drives a relay piston 405 of the clutch booster 401. Reference numeral 411 denotes an air source, and numeral 412 denotes a double-check valve. The clutch booster 401 causes a member 406 to stroke, in proportion to the supplied air, and this member 406 is coupled with the pressure plate of the clutch 304 (FIG. 3).

Figure 4:
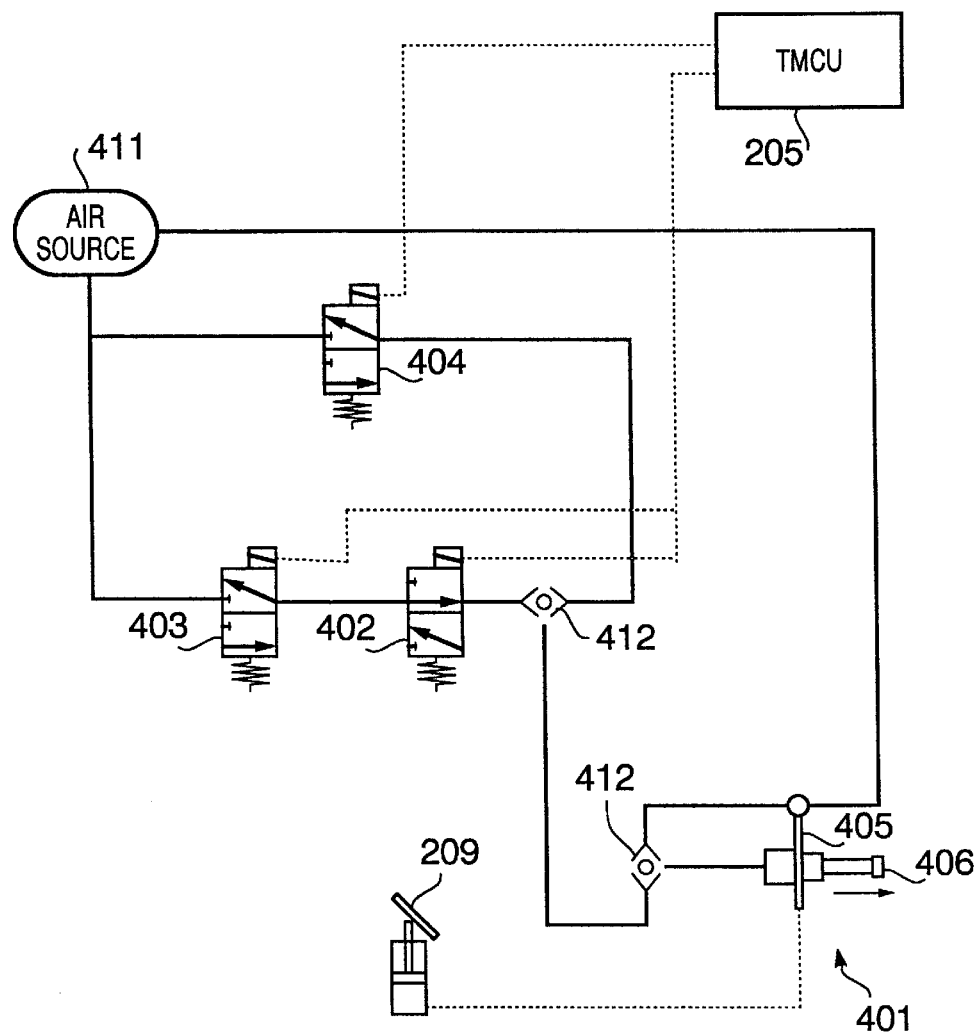
FIG. 4 illustrates an actuator unit in the clutch control device of the present invention.

The following describes how the actuator unit in FIG. 4 operates.

When the main power source is turned on with the vehicle's key switch, TMCU 205 turns on the valve 403 and allows air supply to the proportional valve 402. When the main power source is turned off, TMCU 205 turns off the valve 403 and prevents a drop of the pressure in the air source 411 due to draining of air from the proportional valve 402. When the clutch is disengaged and engaged, TMCU 205 provides a control current to the proportional valve 402. The proportional valve 402 supplies air to the clutch booster 401 in an amount that is proportional to the current, so that any clutch position from clutch complete disengagement to complete engagement can be regulated with the current. Consequently, it is possible to perform a finely tuned control, such as "half-clutch" (partly engaged condition) with TMCU 205. The emergency valve 404 can completely disengage the clutch 304 quickly, and is used to prevent a jerking forward of the vehicle in extra-ordinary circumstances. The emergency valve 404 is turned on and off by TMCU 205, but it can also be actuated manually with an emergency switch (not shown). When the clutch pedal 209 is pushed down by a driver's foot, the member 406 is pushed outward by hydraulic pressure, and the relay piston 405 is driven whereby air is supplied to the clutch booster 401, and helps and supports the stroke of the member 406.

Now, the operation of the transmission assembly 201 will be described.

In the automatic speed change mode, TMCU 205 refers to a shift up map or down map (not shown) based on the requested accelerator opening, which is detected by the accelerator sensor 206, and the vehicle speed, which is determined from the output shaft rotation speed detected by the output shaft rotation speed sensor 204, in order to determine an optimum target gear. Then, the actuator unit of FIG. 4 causes the clutch 304 to disengage, and the splitter 302, main transmission 301 and range 303 are controlled by the pneumatic cylinder unit 202 so as to shift to the target gear position. After that, the clutch 304 is engaged. In the manual mode, TMCU 205 detects a shift up or down operation made by the driver using the shift lever 207 (FIG. 2), determines a target gear and shifts the transmission to that gear. The disengagement and engagement operations of the clutch 304 of FIG. 3 and associated movements of the transmission assembly 201 and pneumatic cylinder unit 202 are the same in the automatic gear speed change mode and manual mode. Thus, they will be described in reference to FIGS. 3 and 5.

Figure 5:
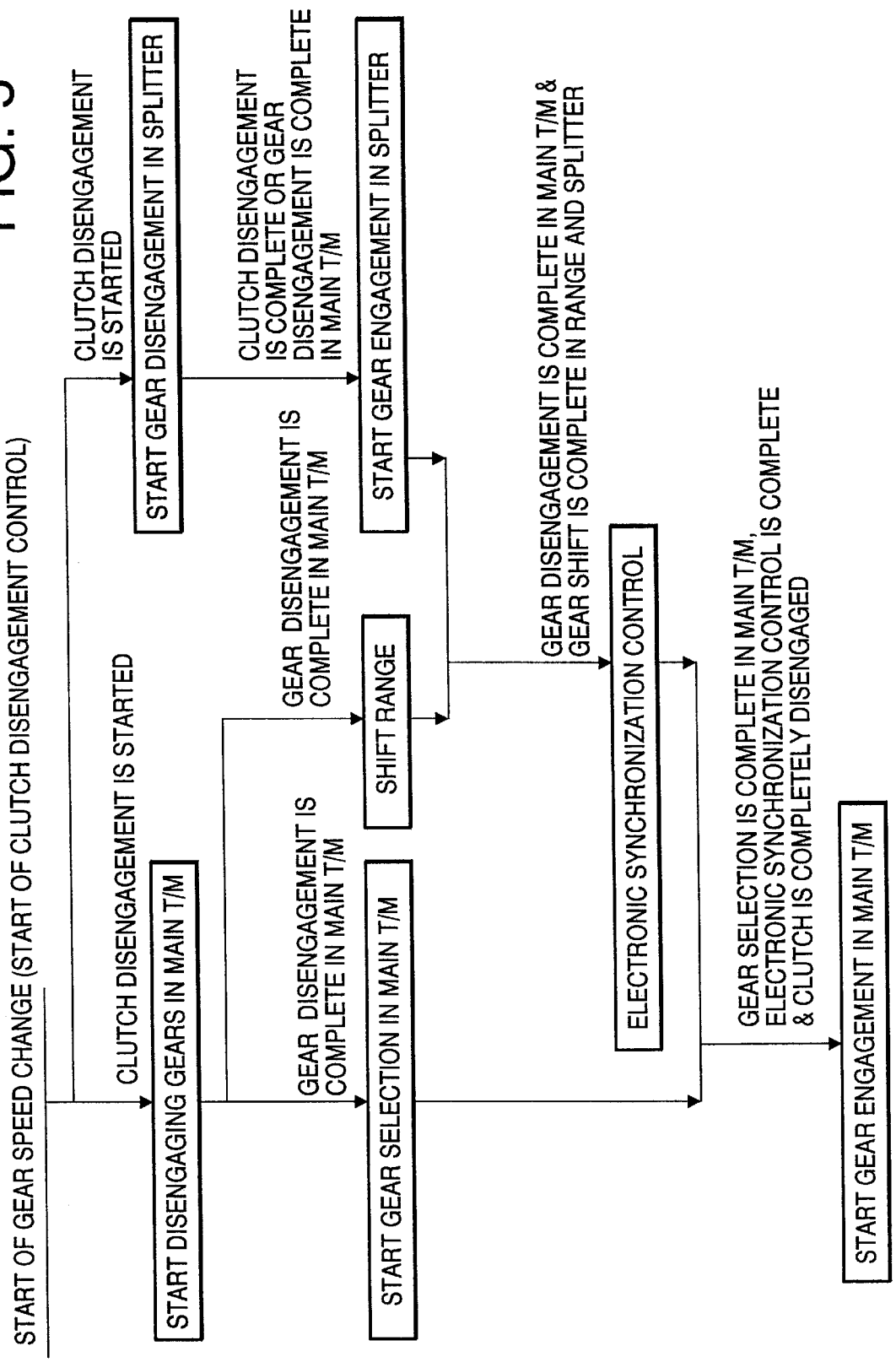
FIG. 5 is a flowchart for gear speed change control according to the present invention.

Referring to FIG. 5, the operations of the main transmission 301, splitter 302 and range 303 are diagramed. Each rectangle indicates the operation and explanation on its shoulder indicates a condition. It should be assumed that the driver starts a gear speed change and the clutch disengagement is initiated under the automatic clutch control. When the start of the clutch disengagement is detected, the gears in the main transmission 301 are disengaged by the sleeve shift cylinder 350. If the splitter gear shift is needed to reach a target gear from a current gear, the gear disengagement is started in the main transmission 301 and simultaneously the gear disengagement is started in the splitter 302 by the splitter cylinder 330 (i.e., the splitter 302 is brought into the neutral position).

If the gear disengagement is complete in the main transmission 301, i.e., the main transmission 301 is brought into its neutral position, the select cylinder 340 starts the gear selecting operation. At the same time, if the range 303 is needed to reach a target gear from a current gear, the range cylinder 360 shifts the range 303 from the H position to the L position or vice versa.

On the other hand, when the clutch 304 is completely disengaged or the main transmission 301 is brought into the neutral position, the splitter cylinder 330 shifts the splitter 302 into the H or L position. Since the splitter 302 is provided with a mechanical synchronization unit, the rotation of the input shaft 305 is synchronized with that of the H or L gear of the splitter 302 so that a smooth gear engagement is attained. It should be noted that if the splitter gear position change is only required to reach the target gear from the current gear, the gear speed change is complete at this point.

When the gear engagement is complete in the splitter 302 and the gear speed change is complete in the range 303, an electronic synchronization is started after the gear disengagement is complete in the main transmission 301.

In the electronic synchronization control, when the rotation speed of the dog gear 321 is higher than that of the sleeve 323 by a predetermined value, a counter shaft brake is activated. Specifically, a counter shaft brake 313 is turned on to reduce the rotation speed of the dog gear 315. If the dog gear 315 rotates slower than the sleeve 323 by a predetermined value, double clutch control and engine control are performed. Specifically, the clutch 304 is temporarily engaged to transfer the engine rotation to the input shaft 305 so as to raise the rotation speed of the input shaft 305. Since the gear engagement is complete in the splitter 302, if the splitter 302 is in the L position, the rotation of the input shaft 305 is transferred to the counter shaft 306 via the main gear 320. If the splitter 302 is in the H position, the rotation of the input shaft 305 is transferred to the counter shaft 306 via the splitter gear 316. Therefore, as the rotation speed of the input shaft 305 is raised, the rotation speed of all the dog gears 321 is raised. In such an electronic synchronization control, the difference between the rotation speed of the dog gear 321 and that of the sleeve 323 is adjusted to fall within a predetermined acceptable range.

When the gear selection is complete in the main transmission 301 and the rotation speed difference of the dog gear relative to the target dog gear has fallen in the acceptable range in the electronic synchronization control, the sleeve shift cylinder 350 shifts the main transmission 310 as far as the complete disengagement of the clutch 304 is confirmed. Since the rotation speed difference between the dog gear 321 and sleeve 323 is within the acceptable range, a smooth gear engagement is attained. When the gear speed change is complete in this manner, current gear information is updated accordingly.

Next, the engine control associated with the gear speed change will be described.

When the transmission assembly 201 is shifted with the pneumatic cylinder unit 202 (FIG. 3) in accordance with the procedure shown in FIG. 5, the clutch 304 is completely disengaged by the clutch booster 401 (FIG. 4). When the clutch 304 is completely disengaged, the engine control 211 (FIG. 2) commands the 0% controlled accelerator opening to the engine, and maintains the 0% controlled accelerator opening until the gear speed change is complete. Consequently, the engine 222 does not race during the gear speed change.

After the gear speed change, the engine controller 211 instructs the controlled accelerator opening in accordance with the requested accelerator opening if the accelerator pedal is not stamped (normal condition). Then, the transmission controller 205 actuates the clutch 304 to the half-engaged position from the complete disengaged position, and subsequently to the complete engaged position. As a result, after the gear speed change is complete, the vehicle is accelerated in prompt response to the driver's intention.

However, if the accelerator pedal is stamped at the time of gear speed change completion, the engine rotation speed is raised before the clutch 304 is completely engaged. Particularly, when the rotation speed of the clutch 304 is relatively slow, the clutch slip occurs and the engine racing takes place. In order to prevent it, the present invention conducts the accelerator opening 0% control as the circumstances demand, as illustrated in FIG. 1.

Referring now to FIG. 1, it is first determined at S1 whether the requested accelerator pedal opening is greater than a predetermined value (e.g., 5%). If the answer is no, the engine racing does not occur so that the program proceeds to end. If the requested accelerator pedal opening is greater than 5%, then the program goes to S2.

At S2, the clutch rotation speed is detected. For example, the rotation speed of the output shaft 311 obtained from the output shaft rotation sensor 204 is multiplied by the gear ratio of the target gear to determine the rotation speed of the clutch 304. It should be noted that the clutch rotation speed may be determined from an output of another sensor rather than the output shaft rotation sensor 204. Since the gear speed change is complete at this point, a sensor may be attached to the driven plate of the clutch or an arbitrary rotating element on the output side such that a resulting value (rotation speed) is multiplied by an appropriate gear ratio to find out the clutch rotation speed. At S2, it is determined whether the clutch rotation speed is smaller than a predetermined speed (e.g., 500 rpm). If the answer is no, the clutch slip hardly occurs so that the program goes to end. If the clutch rotation speed is slower than 500 rpm, the program proceeds to S3.

At S3, it is determined whether a target gear is not equal to a current gear. If the target gear is different from the current gear, it means that the gear speed change is now proceeding. Therefore, the program advances to S4 to turn on the flag. When the procedure of FIG. 1 is later recalled by the timer interruption, and the answers of S1 and S2 are both yes, then the S3 determination is made again. If the target gear is then the same as the current gear, it means that the gear speed change is complete. In such a case, the program proceeds to S5.

Figure 6:
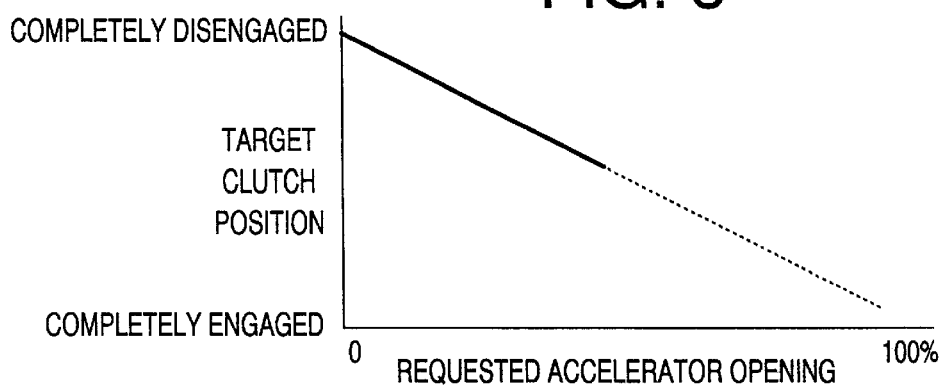
FIG. 6 is a graph used for clutch position control in accordance with the present invention.

At S5, it is determined whether the flag is raised or not. If the flag is raised (flag on), it means that the gear speed change is just complete. Accordingly, the program proceeds to S6 and conducts an initial setting for the accelerator opening 0% control. Specifically, a target clutch position is obtained from the requested accelerator opening. To do this, a curve shown in FIG. 6 is used, for example. In this diagram, when the requested accelerator opening is 0%, the target clutch position is "completely disengaged position". As the requested accelerator pedal opening approaches 100%, the target clutch position becomes close to "completely engaged position". After the target clutch position is decided, the proportional valve 402 (FIG. 4) is actuated to move the clutch to the target position at S9. The accelerator opening 0% control is started at S10. The accelerator opening 0% control is triggered upon a command from the transmission controller 205 to the engine controller 211. The flag is lowered at the subsequent step (S11).

When the program of FIG. 1 is later recalled by the timer interruption and S5 is reached, the gear speed change is already complete and the flag has been lowered so that it is determined that the flag is off. As a result, the program proceeds to S7 to determine if the clutch position has reached the target position.

At S7, if the answer is no, the program proceeds to end in order to continue the accelerator opening 0% control and clutch position control. On the other hand, if the clutch is already at the target position, the program advances to S8 to cancel the accelerator opening 0% control.

In this manner, when the accelerator pedal is stamped at the time of gear speed change completion and the clutch rotation speed is greater than the predetermined value, the controlled accelerator opening is instructed to the engine 222 in accordance with the requested accelerator opening. On the other hand, if the clutch rotation speed is slower than the predetermined value, the accelerator opening 0% control is performed. By doing so, the clutch slip due to the increase of the engine rotation speed does not occur, and the engine does not race. The accelerator opening 0% control is released when the clutch is moved to the target position which corresponds to the requested accelerator opening. Therefore, the engine rotation speed is raised in response to the accelerator pedal depression after the clutch 304 is engaged to such an extent that the engine revolution speed can be raised without causing the clutch 304 to slip.

The clutch tends to slip during the gear speed change while the vehicle is moving at a relatively low speed if the engine revolution speed is relatively high since the clutch rotation speed is relatively slow. In the present invention, however, when the clutch rotation speed is relatively slow, the engine is brought into the idling condition regardless of the stamping of the accelerator pedal. Thus, the clutch does not slip and the engine does not race. In particular, a large and heavy vehicle such as tractor-trailer employs the multi-speed transmission as shown in FIG. 3 and the gear speed change frequently takes place while the vehicle is moving at a relatively slow speed so that the present invention is useful to such a vehicle.

The present invention is not limited to the above-described embodiment. For example, the clutch engagement may be prohibited instead of the accelerator opening 0% control. The clutch engagement prohibition control maintains the clutch in the completely disengaged position. As a result, the controlled accelerator opening is in effect kept to 0%, and therefore the engine does not race. After that, when the accelerator pedal depression becomes smaller than the predetermined value, the clutch engagement is conducted since the engine does not race even if the controlled accelerator opening is instructed to the engine in accordance with the requested accelerator opening (i.e., the accelerator pedal stamping) in such a situation.

What is claimed is:

1. An apparatus for controlling a vehicle clutch comprising:
    an engine controller for normally instructing an opening degree of an accelerator to an engine in accordance with an amount of stamping of an accelerator pedal but instructing 0% opening to the engine when the accelerator pedal is stamped over a predetermined value at a time of completion of transmission gear speed change, and a rotation speed of a clutch is slower than a prescribed speed.

2. The apparatus of claim 1 further including a clutch actuator unit for automatically engaging the clutch after a target clutch position is determined in accordance with an amount of stamping of the accelerator pedal, and wherein the engine controller stops instructing the 0% opening to the engine when an actual clutch position matches the target clutch position.

3. The apparatus of claim 2, wherein the clutch actuator unit holds the clutch to a completely disengaged position while the engine controller is instructing the 0% opening to the engine.

4. The apparatus of claim 1, wherein the engine controller instructs the 0% opening to the engine while the transmission gear speed change is proceeding.

5. The apparatus of claim 2, wherein the engine controller instructs the 0% opening to the engine while the transmission gear speed change is proceeding.

6. The apparatus of claim 3, wherein the engine controller instructs the 0% opening to the engine while the transmission gear speed change is proceeding.

7. The apparatus of claim 1, wherein the predetermined value is about 5% of a whole effective stroke of the accelerator pedal.

8. The apparatus of claim 1, wherein the prescribed speed is about 500 rpm.

9. An apparatus for controlling a vehicle clutch comprising:

first means for instructing an opening degree of an accelerator to an engine in accordance with an amount of stamping of an accelerator pedal; and second means for instructing 0% opening to the engine when the accelerator pedal is stamped over a predetermined value at a time of completion of transmission gear speed change, and a rotation speed of a clutch is slower than a prescribed speed.

10. The apparatus of claim 9 further including third means for automatically engaging the clutch after a target clutch position is determined in accordance with an amount of stamping of a clutch pedal, and wherein the second means stops instructing the 0% opening to the engine when an actual clutch position matches the target clutch position.

11. The apparatus of claim 10, wherein the third means holds the clutch to a completely disengaged position when the second means instructs the 0% opening to the engine.

12. The apparatus of claim 9, wherein the second means instructs the 0% opening to the engine while the transmission gear speed change is proceeding.

13. The apparatus of claim 9, wherein the predetermined value is about 5% of a whole effective stroke of the accelerator pedal.

14. The apparatus of claim 9, wherein the prescribed speed is about 500 rpm.

* * * * *